US008450542B2

(12) United States Patent
Yao et al.

(10) Patent No.: US 8,450,542 B2
(45) Date of Patent: *May 28, 2013

(54) INTEGRATED PROCESS FOR CONVERTING CARBOHYDRATES TO HYDROCARBONS

(75) Inventors: Jianhua Yao, Bartlesville, OK (US); Edward L. Sughrue, Bartlesville, OK (US); Dhananjay B. Ghonasgi, Bartlesville, OK (US); Joseph B. Cross, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 740 days.

This patent is subject to a terminal disclaimer.

(21) Appl. No.: 12/644,438

(22) Filed: Dec. 22, 2009

(65) Prior Publication Data

US 2010/0099933 A1 Apr. 22, 2010

Related U.S. Application Data

(63) Continuation-in-part of application No. 11/303,636, filed on Dec. 16, 2005, now Pat. No. 7,678,950.

(60) Provisional application No. 61/248,099, filed on Oct. 2, 2009.

(51) Int. Cl.
C07C 1/00 (2006.01)
C13B 35/06 (2011.01)
C10G 3/00 (2006.01)

(52) U.S. Cl.
CPC ........................................ *C10G 3/42* (2013.01)
USPC .......... 585/240; 585/640; 585/733; 127/46.2; 127/69

(58) Field of Classification Search
USPC .................... 585/240, 408, 640, 733; 127/69, 127/46.2; 210/674
See application file for complete search history.

(56) References Cited

U.S. PATENT DOCUMENTS

| | | | |
|---|---|---|---|
| 1,411,203 A | 3/1922 | Bright | |
| 1,411,204 A | 3/1922 | Bright | |
| 2,518,235 A | 8/1950 | Hartstra et al. | |
| 3,630,775 A | 12/1971 | Winkler et al. | |
| 3,695,933 A | 10/1972 | Deaton | |
| 3,963,789 A | 6/1976 | Kruse et al. | |
| 3,998,898 A | 12/1976 | Chang et al. | |
| 4,011,278 A | 3/1977 | Plank et al. | |
| 4,148,835 A | 4/1979 | Chen et al. | |
| 4,300,009 A | 11/1981 | Haag et al. | |
| 4,306,106 A | 12/1981 | Kerr et al. | |
| 4,308,411 A | 12/1981 | Frankiewicz | |
| 4,330,625 A * | 5/1982 | Miller et al. | 435/161 |
| 4,380,680 A | 4/1983 | Arena | |
| 4,430,253 A | 2/1984 | Dubeck et al. | |
| 4,503,278 A | 3/1985 | Chen et al. | |
| 4,511,667 A | 4/1985 | Mao et al. | |
| 4,523,928 A | 6/1985 | Hillman et al. | |
| 4,549,031 A * | 10/1985 | Chen et al. | 585/408 |
| 4,933,283 A * | 6/1990 | Chen et al. | 435/166 |
| 4,950,812 A | 8/1990 | Jacobs et al. | |
| 5,396,016 A | 3/1995 | Jablonski et al. | |
| 5,494,602 A | 2/1996 | Thomaides et al. | |
| 5,600,028 A | 2/1997 | Gubitosa et al. | |
| 6,121,503 A | 9/2000 | Janssen et al. | |
| 6,441,255 B1 * | 8/2002 | Haas et al. | 568/881 |
| 6,570,043 B2 | 5/2003 | Elliott et al. | |
| 7,678,950 B2 * | 3/2010 | Yao et al. | 585/240 |
| 2003/0130545 A1 | 7/2003 | Werpy et al. | |
| 2005/0112739 A1 | 5/2005 | Golubkov | |
| 2007/0142633 A1 | 6/2007 | Yao et al. | |
| 2008/0160593 A1 | 7/2008 | Oyler | |
| 2009/0326286 A1 | 12/2009 | Yie et al. | |

OTHER PUBLICATIONS

Dao et al., Reactions of Model Compounds of Biomass-Pyrolysis Oils Over ZSM-5 Zeolite Catalysts, ACS Symposium Series 376, 1988, pp. 327-341, American Chemical Society.
PCT/US10/48226 International Search Report (PCT/ISA/210) dated Feb. 10, 2009.

* cited by examiner

*Primary Examiner* — Nina Bhat
(74) *Attorney, Agent, or Firm* — Phillips 66 Company

(57) ABSTRACT

An integrated process for the conversion of carbohydrate containing materials to gasoline boiling range hydrocarbons is disclosed. A carbohydrate containing material may be converted to a hydrogenated carbohydrate containing material with a bi-functional catalyst. The hydrogenated carbohydrate containing material may be reacted in the presence of another catalyst to form a reaction product containing non-aromatic and aromatic gasoline boiling range hydrocarbons.

21 Claims, No Drawings

INTEGRATED PROCESS FOR CONVERTING CARBOHYDRATES TO HYDROCARBONS

CROSS-REFERENCE TO RELATED APPLICATIONS

The present invention is a continuation-in-part of U.S. application Ser. No. 11/303,636 filed on Dec. 16, 2005 entitled "PROCESS FOR CONVERTING CARBOHYDRATES TO HYDROCARBONS", which is hereby incorporated by reference in its entirety. The present application also claims priority benefit under 35 U.S.C. §119(e) of U.S. Provisional Patent Application Ser. No. 61/248,099, filed on Oct. 2, 2009, entitled "INTEGRATED PROCESS FOR CONVERTING CARBOHYDRATES TO HYDROCARBONS" which is hereby incorporated by reference in its entirety.

FIELD OF THE INVENTION

The present invention relates generally to the conversion of carbohydrates to fuel range hydrocarbons.

BACKGROUND OF THE INVENTION

There is a national interest in the discovery of alternative sources of fuels and chemicals, other than from petroleum resources. As the public discussion concerning the availability of petroleum resources and the need for alternative sources continues, it is anticipated that future government mandates will require transportation fuels to include, at least in part, hydrocarbons derived from sources besides petroleum. As such, there is a need to develop alternative sources for hydrocarbons useful for producing fuels and chemicals.

One possible alternative source of hydrocarbons for producing fuels and chemicals is the natural carbon found in plants and animals, such as for example, in the form of carbohydrates. These so-called "natural" carbon resources (or renewable hydrocarbons) are widely available, and remain a target alternative source for the production of hydrocarbons. For example, it is known that carbohydrates and other sugar-based feed stocks can be used to produce ethanol, which has been used in gasoline and other energy applications. However, the use of ethanol in transportation fuels has not proven to be cost effective.

Carbohydrates, however, also can be used to produce fuel range hydrocarbons. The upgrading of biologically derived materials to materials useful in producing fuels is known in the art. However, many carbohydrates (e.g., starch) are undesirable as feed stocks due to the costs associated with converting them to a usable form. In addition, many carbohydrates are known to be "difficult" to convert due to their chemical structure, or that the hydrocarbon product produced is undesirable or will result in low quantities of desirable product. Among the compounds that are stated to be difficult to convert include compounds with low effective hydrogen to carbon ratios, including carbohydrates such as starches and sugars, carboxylic acids and anhydrides, lower glycols, glycerin and other polyols and short chain aldehydes.

Efforts have been made to convert traditionally difficult to convert materials to hydrocarbons by focusing on methods for increasing the effective hydrogen to carbon ratio of the reactants, including converting oxygenates in the presence of hydrogen, CO, steam, or other reactants, and by employing various catalysts. However, these processes are often complex and are costly, and the reaction products produced as a result of these processes are oftentimes undesirable, or result in low weight percentages, and often result in an increase in undesirable byproducts such as the production of carbon monoxide and carbon dioxide.

As such, development of an improved process for converting carbohydrates, including the "difficult" type as mentioned above, to hydrocarbon, would be a significant contribution to the arts. In addition, development of a process for converting carbohydrates to hydrocarbons which yields significant quantities of desirable hydrocarbon products such as aromatics and olefins would be a significant contribution to the art.

SUMMARY OF THE INVENTION

In one embodiment of the present invention, an integrated process is provided for converting carbohydrates to hydrocarbons comprising: a) contacting a carbohydrate-containing material with a bi-functional solid acid supported metal catalyst under a condition sufficient to form a liquid product comprising hydrogenated product, and b) contacting the liquid product comprising hydrogenated product with a catalyst composition comprising a zeolite under a condition sufficient to form a reaction product containing gasoline boiling range hydrocarbons.

In another embodiment of the present invention, an integrated process is provided for converting carbohydrates to hydrocarbons comprising: a) contacting a carbohydrate-containing material with a bi-functional solid acid supported metal catalyst under a condition sufficient to form a liquid product comprising hydrogenated product, and b) contacting the liquid product comprising hydrogenated product and a hydrogen donor compound with a catalyst composition comprising a zeolite under a reaction conditions sufficient to form a reaction product containing gasoline boiling range hydrocarbons.

Other objects, advantages and embodiments of the invention will be apparent from the following detailed description of the invention and the appended claims.

DETAILED DESCRIPTION OF THE INVENTION

Carbohydrates, such as starches and sugars may be converted in accordance with the present invention to form a hydrocarbon mixture useful for liquid fuels and chemicals. The term, "carbohydrate" is used generally to refer to a compound of carbon, hydrogen and oxygen having the general formula $C_x(H_2O)_y$, in which the ratio of hydrogen to oxygen is the same as in water. Carbohydrates include monosaccharides, polysaccharides, and mixtures of monosaccharides and/or polysaccharides. The term "monosaccharide" or "monosaccharides" are generally hydroxy aldehydes or hydroxy ketones which cannot be hydrolyzed into any simpler carbohydrate. Examples of monosaccharides include dextrose, glucose, fructose and galactose. The term "polysaccharide" or "polysaccharides" include those saccharides containing more than one monosaccharide unit. This term also includes disaccharides (such as sucrose, maltose, cellobiose, and lactose) and oligosaccharides.

Generally, carbohydrates useful in the present invention are characterized as having an overall effective hydrogen to carbon ratio of about zero, although carbohydrates having an overall effective hydrogen to carbon ratio greater than zero may also be used. The effective hydrogen to carbon ratio may be determined by the gross composition of the carbohydrate starting material according to the formula described in U.S. Pat. No. 4,503,278 of:

$$(H/C)_{eff} = (H - 2O - 3N - 2S)/C$$

where H, C, O, N, and S are the relative atom ratios of hydrogen, carbon, oxygen, nitrogen and sulfur as determined by elemental analysis on an anhydrous basis. For example, the approximate chemical formula for starch is $(C_6H_{10}O_5)_n$. Inserting the appropriate values in the above equation gives:

$$H/C_{eff}=(10-2(5)-3(0)-0-2(0))/6=0/6=0.$$

Useful carbohydrates in the present invention include, but are not limited to, carbohydrates that can be converted to hydrocarbons when contacted under suitable reaction conditions. The carbohydrate starting material may be insoluble in an aqueous medium such as water, substantially insoluble in an aqueous medium, or partially insoluble in an aqueous medium. In addition, carbohydrates useful in the present invention may be soluble in an aqueous medium, substantially soluble in an aqueous medium, or partially soluble in an aqueous medium. In addition, carbohydrates useful in the present invention may be in a pure form, or may be mixed with other components, including but not limited to, additives.

Generally, suitable carbohydrate-containing materials include, but are not limited to, materials containing polysaccharides and/or monosaccharides, such as for example, dextrose, mannose, galactose, fructose and sucrose, and products derived from hydrolyzed polysaccharides such as starch (e.g., corn starch or other starches derived from other cereal grains such as wheat and rice, or those from tubers, such as potato, tapioca, and arrowroot, or those that are waxy starches such as waxy moil (what is moil?), maize and rice) and starch decomposition products such as dextrin and corn syrup (also known as glucose syrup).

Other suitable carbohydrate-containing materials, include, but are not limited to, corn syrup and related products. Generally, any oxygenated hydrocarbon molecule or hydrocarbon molecule may be used in the present inventive process.

The amount of carbohydrate used as the starting material in the present invention will vary depending on the size of the commercial process or suitability of the mixing/reaction vessel. Generally, when combined with water or other liquid at elevated temperatures, carbohydrates such as starch granules absorb water and swell to many times their original size thus making the gelatinized or swollen product very viscous. For example, when starch is used as a starting material in a solid form, the starch may contain in the range of from about 10 to about 90% solid particle, in relation to the percentage of liquid medium. In one embodiment of the present invention, the carbohydrate in liquid medium is the range of from about 10 to about 80 weight percent, based on the total weight of the carbohydrate/liquid medium mixtures. In another embodiment of the present invention, the carbohydrate in liquid medium is the range of from about 15 to about 70 weight percent, based on the total weight of the carbohydrate/liquid medium mixture. In another embodiment of the present invention, the carbohydrate in liquid medium is in the range of from about 20 to about 60 weight percent, based on the total weight of the carbohydrate/liquid medium mixture.

Useful catalysts in the present invention include a bi-functional catalyst used to produce a hydrogenated product in the conversion of carbohydrates to hydrocarbons. The bi-functional catalyst employed in the present invention may vary over a wide range and will depend upon the particular catalyst, carbohydrate, temperature and pressure which are employed in the process.

Generally, this bi-functional catalyst includes those containing an active metal on a support material. The bi-functional catalyst may be prepared by any method known in the art, including combining the metal with the support using conventional means including but not limited to impregnation, ion exchange and vapor deposition.

Examples of suitable metals include, but are not limited to, platinum, palladium, nickel, copper, iron, cobalt, zinc, lead, tin, mercury, ruthenium, and combinations thereof, metal alloys of such metals, and oxides and chlorides of such metals.

The metal of such useful bi-functional catalysts for producing a hydrogenated product in the conversion of carbohydrates to hydrocarbons in the present invention is usually distributed over the surface of a support in a manner that maximizes the surface area of the metal.

The support of such useful bi-functional catalysts in the present invention include, but are not limited to, solid acid catalyst (e,g, ion exchange resin including acid resin, acidic zeolites, and silica-alumina of natural or synthetic origin). Ion exchange resin, for example, are insoluble matrices (or support structures) of electrolytes normally in the form of small (1-2 mm diameter) beads, fabricated from an organic polymer substrate (such as polystyrene). In addition, the ion-exchange resins contain two types of ions, those which are bound within the substrate, and the oppositely charged counter ions that are free. When an ion-exchange resin is immersed in a medium in which it is insoluble or partially or substantially insoluble, the counter ions are mobile and may be exchanged for other counter ions from the surrounding medium, whereas ions of the same type of charge as the bound ions do not have free movement into and out of the polymer substrate. Generally, ion exchange resins useful in the present invention may be classified based on the charge of the exchangeable counter ion (cation exchanger or anion exchanger) and the ionic strength of the bound ion (strong exchanger or weak exchanger). Ion-exchange resins useful in the present invention may include by way of example strongly acidic ion-exchange resins such as those containing sulfonic acid groups or corresponding salts. In addition, ion-exchange resins useful in the present invention may include by way of example weakly acidic ion-exchange resins, such as those containing carboxylic acid groups or corresponding salts. In addition, ion exchange resins useful in the present invention may contain or be supported on various polymer substrates including, but not limited to, styrene, polystyrene, and acrylic-based monomers.

Non-limiting suitable examples of ion-exchange resins useful in the present invention, include but are not limited to, Amberlyst™-15, Amberlyst™ XN-1005, Amberlyst™ XN-1008, Amberlyst™ XN-1010, Amberlyst™ XN-1011, Amberlite™ 200, Amberlite™-IR-120 (H), and combinations thereof. In one embodiment of the present invention, the ion-exchange resin is a polystyrene supported resin containing sulfonic acid groups commercially available from Rohm and Haas under the trade designation "Amberlite™ IR-120 (H)."

Generally, ion exchange resins useful in the present invention are present in an amount in the range of from about 0.02 to about 20 percent, based on the weight of the carbohydrate/liquid medium mixture. In one embodiment of the present invention, the ion exchange resin is present in an amount in the range of from about 0.04 to about 4 percent, based on the weight of the carbohydrate/liquid medium mixture. In another embodiment of the present invention, the ion exchange resin is present in an amount in the range of from about 0.06 to about 2 percent, based on the weight of the carbohydrate/liquid medium mixture. In another embodiment of the present invention, the ion exchange resin is present in an amount in the range of from about 0.08 to about 1 percent, based on the weight of the carbohydrate/liquid medium mixture.

The use of such bi-functional catalyst in the present invention allows the conversion of a generally non-hydrolyzed carbohydrate-containing compound (such as for example, starch) to be hydrolyzed and hydrogenated in one step under a condition sufficient to form a hydrolyzed/hydrogenated product. In one embodiment of the present invention, the bi-functional catalyst contains ruthenium and palladium supported on an acid resin (such as for example, Amberlite™ 120(H) commercially available from Rohm and Haas).

In accordance with the present invention, carbohydrates useful in the present invention may be optionally mixed into any aqueous reaction medium, including water. Thereafter, the carbohydrate-containing material may be contacted with either hydrogen or hydrogen mixed with a suitable gas along with a catalyst composition under a condition sufficient to form a hydrogenated product.

The gas may be introduced into the reaction chamber under pressure, which may vary with the nature of the reactants and the bi-functional catalyst employed. The rate at which gas is charged to the reaction vessel is any suitable rate.

According to the present invention, the conversion of carbohydrate to hydrogenated product may be carried out in any suitable type of apparatus which enable intimate contact of the reactants and control of the operating conditions. The process may be carried out in batch, semi-continuous, or continuous operation. In one embodiment of the present invention, a batch operation in a conventional autoclave is used. The reactants may be added to the reaction chamber in any suitable manner or in any suitable order. In one embodiment of the present invention, the hydrogenation catalyst is added first to the carbohydrate-containing solution, and thereafter, fed with hydrogen.

In one embodiment of the present invention, the carbohydrate/liquid medium/bi-functional catalyst/hydrogen or hydrogen containing gas mixture may be contacted under a condition sufficient to produce hydrogenated product.

Generally, such a condition may include heating the mixture at a temperature in the range of from about 50° C. to about 250° C. In another embodiment of the present invention, the temperature is in the range of from about 100° C. to about 200° C. In another embodiment of the present invention, the temperature is in the range of from about 110° C. to about 150° C.

In another embodiment of the present invention, the carbohydrate/liquid medium/bi-functional catalyst/hydrogen or hydrogen containing gas mixture is subjected to a pressure is in the range of from about 0 to about 2000 psig. In another embodiment of the present invention, the pressure is in the range of from about 10 to about 500 psig. In another embodiment of the present invention, the pressure is in the range of from about 15 to about 100 psig. In one embodiment of the present invention, the carbohydrate/liquid medium/bi-functional catalyst/hydrogen or hydrogen containing gas mixture is not subjected to additional pressure, other than the natural pressure resulting from heating that the carbohydrate/liquid medium/bi-functional catalyst/hydrogen or hydrogen containing gas mixture It is, however, understood that higher and lower temperatures and pressures than those described above may be used when deemed necessary or desirable to optimize results.

The time of reaction will depend upon the specific starting material, concentration, the specific catalyst used, pressure and temperature. Generally, the duration of reaction is in the range of from about 20 minutes to about 120 minutes, which may be shorter or longer depending on the desired hydrogenation. In one embodiment of the present invention, the carbohydrate/liquid medium/bi-functional catalyst/hydrogen or hydrogen containing gas mixture is subjected to a temperature and pressure for a time period in the range of from about 10 minutes to about 120 minutes. In another embodiment of the present invention, the time period is in the range of from about 20 minutes to about 90 minutes. In still another embodiment of the present invention, the time period is in the range of from about 25 minutes to about 60 minutes.

Generally, the carbohydrate-containing starting material, after the above process produces a liquid product comprising hydrogenated product. The liquid product from the hydrogenation step is believed to contain, among other things, polyhydric alcohols of the respective monosaccharide sugar. For example, when cornstarch (whose basic structural components consist of glucose units), is hydrolyzed and hydrogenated, the resulting reaction product contains the polyhydric alcohol-sorbitol. Other examples include diols, glycols, or etc. The Liquid product from the hydrogenation step may also contain some non-hydrogenated residuals such as but not limited to organic acids, ketones, epoxides, furans or etc.

In accordance with one embodiment of the present invention, the liquid product comprising hydrogenated product may be contacted with a suitable zeolite catalyst composition under a condition sufficient to produce a reaction product containing gasoline boiling range hydrocarbons. In accordance with another embodiment of the present invention, the liquid product comprising hydrogenated product may be combined with any hydrogen donor, such as any hydrocarbons (e.g. iso-pentane) or alcohols (e.g. methanols), and thereafter, contacted with a suitable zeolite catalyst composition under a condition sufficient to produce a reaction product containing gasoline boiling range hydrocarbons.

The liquid product comprising hydrogentated product may be contacted with a catalyst composition containing a zeolite under a condition sufficient to produce a reaction product containing gasoline boiling range hydrocarbons. Useful catalyst compositions in the present invention include zeolites or zeolite material effective in the conversion of carbohydrates to hydrocarbons when contacted under suitable reaction conditions. Examples of suitable zeolites include, but are not limited to, those disclosed in Kirk-Othmer Encyclopedia of Chemical Technology, third edition, volume 15, pages 638-669 (John Wiley & Sons, New York, 1981). Generally, zeolites useful in the present invention have a constraint index (as defined in U.S. Pat. No. 4,097,367, which is incorporated herein by reference) in the range of from about 0.4 to about 12, and preferably in the range of from about 2 to about 9. In addition, the molar ration of $SiO_2$ to $Al_2O_3$ in the crystalline framework of the zeolite is at least about 5:1 and can range up to infinity. In one embodiment of the present invention, the molar ratio of $SiO_2$ to $Al_2O_3$ in the crystalline framework of the zeolite is in the range of from about 8:1 to about 200:1. In another embodiment of the present invention, $SiO_2$ to $Al_2O_3$ in the crystalline framework of the zeolite is in the range of from about 12:1 to about 100:1. Zeolites useful in the present invention include but are not limited to ZSM-5, ZSM-8, ZSM-11, ZSM-12, ZSM-35, ZSM-38 and combinations thereof. Some of these zeolites are also known as "MFI" or "Pentasil" zeolites. In one embodiment of the present invention, the zeolite is ZSM-5. Modified zeolites can also be used. Modified zeolites can include zeolites modified by metal cations, such as, for example, zinc, gallium, or nickel. Zeolites can also be modified by steam treatment and/or acid treatment. In addition, zeolites of the present invention may be combined with a clay, promoter, and/or a binder. Zeolites useful in the present invention may also contain an inorganic binder (also referred to as matrix material) selected from the group consisting of alumina, silica, alumina-silica, aluminum phosphate, clays (such as bentonite), and combinations thereof. The type of zeolite used will cause the final product to vary considerably.

Reaction, or conversion, conditions for contacting a carbohydrate-containing material, whether or not such material has been hydrolyzed and/or hydrogenated, includes a reaction temperature in the range of from about 100° C. to about 1000° C. In another embodiment of the present invention, the temperature is in the range of from about 150° C. to about 800° C. In another embodiment of the present invention, the temperature is in the range of from about 200° C. to about 600° C. In another embodiment of the present invention, the temperature is in the range of from about 300° C. to about 500° C. The reaction, or conversion, conditions for contacting a carbohydrate-containing material, whether or not such material has been hydrolyzed and/or hydrogenated, includes a pressure in the range of from about 1 pound per square inch gauge (psig) to about 500 pounds per square inch gauge (psig). In one embodiment of the present invention, the pressure is in the range of from about 3 to about 400 psig. In another embodiment of the present invention, the pressure is in the range of from about 5 to about 200 psig.

The carbohydrate-containing material, whether or not such material has been hydrolyzed and/or hydrogenated, may be contacted with a suitable gas, such as for example, hydrogen or nitrogen in order to form a product containing hydrocarbons. The gas may be introduced into the reaction chamber under pressure, which may very with the nature of the reactants and the zeolite catalyst employed. The flow rate may vary depending on the specific reaction conditions. In one embodiment of the present invention, the flow rate of gas is approximately in the range of 25 cc/min to 300 cc/min.

The time of reaction will depend upon the specific starting material, concentration, the specific catalyst used, pressure and temperature. Generally, the duration of reaction is in the range of from about 0.01 to about 100 minutes, which may be shorter or longer depending on the desired hydrogenation. The reaction is carried out in any suitable type of apparatus or reaction chamber which enable intimate contact of the reactants and control of the operating conditions. The process may be carried out in batch, semi-continuous, or continuous operation. In one embodiment of the present invention, a batch operation in a conventional autoclave is used. The reactants may be added to the reaction chamber in any suitable manner or in any suitable order. In one embodiment of the present invention, the carbohydrate-containing solution is fed through the zeolite catalyst.

The process effluent, from the conversion zone, in accordance with the present invention, generally may contain gas and liquid fractions containing hydrocarbon products, which include, but are not limited to, a light gas fraction containing hydrogen, and methane, a $C_2$-$C_3$ fraction containing ethane, propane, ethylene, and propylene, an intermediate fraction including non-aromatic compounds having greater than 3 carbon atoms, a BTX aromatic hydrocarbons fraction (containing benzene, toluene, ortho-xylene, meta-xylene, and para-xylene) and a $C_9$-$C_{13}$+ fraction containing aromatic compounds having 9-13 or more carbon atoms per molecule.

In addition, the process effluent of the present invention, may also contain by products of carbon monoxide and carbon dioxide ($CO_x$). According to one embodiment of the present invention, the hydrocarbon product contain less $CO_x$, and less coke and other undesirable products are produced, when the reaction conditions are modified, for example, when the reaction conditions are at pressures generally in the range of from about 100 psig to about 200 psig. In addition, it has been discovered that higher reaction pressures, preferably at about 200 psig, result in the production of less $CO_x$ (preferably less than about 25 weight percent of the product), less coke, and greater upgrading of the hydrocarbon stream to a higher-octane gasoline.

The following examples are presented to further illustrate the present invention and are not to be construed as unduly limiting the scope of this invention.

EXAMPLE I

This example illustrates a process of converting carbohydrates to gasoline boiling range hydrocarbons (such as for non-aromatic and aromatic gasoline boiling range hydrocarbons) including step 1 for converting (e.g. hydrolysis/hydrogenation) carbohydrate-containing material (e.g. starch) to hydrogenated carbohydrated-containing material (e.g. sugar alcohol such as sorbitol) over a bi-functional catalyst (e.g. Ru/Pd/acid resin catalyst), and step 2 for converting the hydrogenated carbohydrated-containing material from step 1 to gasoline boiling range hydrocarbons over a zeolite catalyst (e.g. ZSM-5 catalyst).

Step 1: Starch Hydrolysis and Hydrogenation to Produce Sugar-Alcohol (Sorbitol) in One Step.

Table 1 showed that when Ru and Pd were supported on the acid resin, the resulting catalyst was very effective in converting starch to sugar alcohol (sorbitol) in one step. Approximately 97% of starch was converted to sorbitol. The reaction was carried out at 140 C, 1300 psig $H_2$ in an autoclave reactor. The reactor was charged with 60 g of corn starch, 100 g of water and 1300 psig of $H_2$. At 140 C, hydrogen consumption was observed. After 4 hrs of the reaction, starch was completely converted. HPLC analysis indicated that starch was primarily converted to sorbitol. The acid resin used in this catalyst was Amberlite™.

TABLE 1

| Catalyst | Ru/Pd/Acid Resin (Ru and Pd supported on acid resin) |
|---|---|
| Product: Sorbitol, wt % | 97 |
| Others, wt % | 3 |

Step 2: Converting Sorbitol to Hydrocarbons on a ZSM-5 Catalyst. The liquid product made from step 1 was co-fed with i-pentane over a ZSM-5 catalyst at 500° C. The resulting product distribution is shown below. The feed rate of the liquid product from step 1 was 21.2 ml/hr and i-pentane feed rate was 12.5 ml/hr. 8 g of ZSM-5 was used in a fixed bed reactor as a catalyst.

| Final product distribution (C mole %) | |
|---|---|
| C1-C4 paraffins | 3.6 |
| C2-C4 olefins | 14.0 |
| C5+ (mainly aromatics) | 64.4 |
| CO + CO2 | 18.0 |
| Sorbitol conversion: | 95% |

EXAMPLE II

This example illustrates a process of converting corn syrup to gasoline boiling range hydrocarbons (such as for non-aromatic and aromatic gasoline boiling range hydrocarbons) including hydrogenating the corn syrup, and then converting the product over a zeolite catalyst.

Step 1—Hydrogenation of Corn Syrup

A corn syrup/water (50 wt %/50 wt %) solution and hydrogen gas were fed through a Ru/$Al_2O_3$ catalyst at 200° F. and 150 psig as shown in Table II-A below:

TABLE II-A

Hydrogenation of Corn Syrup

| Step | Gas Feed | Corn Syrup/Water Feed | Temperature/ Pressure | First Catalyst | Resulting product |
|---|---|---|---|---|---|
| 1 | Hydrogen (300 cc/min) | Corn Syrup/Water Feed (50 wt %/50 wt %) (13.13 cc/hr) | 200° F./150 psig | Ru/Al$_2$O$_3$ | Liquid |

The hydrogenated liquid product was collected and used for the liquid feed in step 2 below.

Step 2—Conversion over ZSM-5

The hydrogenated liquid product was collected and used as feed, and reacted over ZSM-5 catalyst as shown in the table below. Both the gas phase and liquid phase products were analyzed by gas chromatography to determine the hydrocarbon product distribution.

| Step | Gas Feed | Liquid Feed | Temperature/ Pressure | Second Catalyst | Resulting product |
|---|---|---|---|---|---|
| 2 | n/a | Product from Step 1 (24 cc/hour) | 400° C./10 psig | 8.0 g ZSM-5 | *See product distribution in Table II-B and Table II-C below |

TABLE II-B

Hydrocarbon product distribution (includes both gas and liquid phase)

| | Carbon Number | | | | | | |
|---|---|---|---|---|---|---|---|
| | C1 | C2= | C2 | C3= | C3 | C4= | C4 | C5+ |
| Weight Percent | 0.15 | 3.01 | 0.1 | 4.43 | 0.35 | 1.52 | 0.25 | 90.19 |

TABLE II-C

Liquid Phase Hydrocarbon Product Analyzed by DHA method

| Carbon Number/Group | Weight percent |
|---|---|
| C5 | 0.019 |
| C6 | 0.932 |
| C7 | 10.098 |
| C8 | 23.377 |
| C9 | 14.71 |
| C10 | 12.764 |
| C11 | 9.045 |
| C12 | 3.161 |
| C13+ | 6.815 |
| Aromatics | 69.52 |
| Paraffin | 0.36 |
| i-Paraffin | 2.66 |
| Naphthenes | 0.77 |
| Unidentified | 19.08 |

TABLE II-C-continued

Liquid Phase Hydrocarbon Product Analyzed by DHA method

| Carbon Number/Group | Weight percent |
|---|---|
| Plus | 6.77 |
| Olefins | 0.85 |

EXAMPLE III

This example illustrates a process of converting hydrogenated carbohydrates, specifically, sorbitol, to gasoline boiling range hydrocarbons (such as for non-aromatic and aromatic gasoline boiling range hydrocarbons) by combining sorbitol with iso-pentane, and reacting the mixture over ZSM-5 catalyst.

In this example, a sorbitol/water/iso-pentane mixture was co-fed along with hydrogen gas through a ZSM-5 zeolite. As shown in the Table III-A, conversions of sorbitol and iso-pentane were observed. The liquid product was rich in aromatics and the gas phase product was rich in olefins. About 28 weight percent of the product was $C_2$-$C_4$ olefins, 16 weight percent $CO_x$, 51 weight percent $C_5$+ and 5 weight percent $C_1$-$C_4$ paraffins. For the liquid product, about 83% were aromatics with most being $C_7$ or $C_8$.

TABLE III-A

| | Sorbitol + Iso-pentane | | | | |
|---|---|---|---|---|---|
| Feed 1 HC-liquid | Feed 2 | Gas Feed | Temp. | Catalyst | Resulting product |
| I-C5 (density - .62 g/mL) | Sorbitol (28.6 wt %) Water (71.4 wt %) density (1.103 g/mL) | H2 (150 mL/min) | 500° C. | 8.0 g ZSM-5 | *See product distribution in Table III-B, Table III-C, and Table III-D below. |

TABLE III-B

Reactant % Conversion

| Reactant | % Conversion |
|---|---|
| Sorbitol | 95.93 |
| I-C5 | 19.41 |

TABLE III-C

Liquid Phase Hydrocarbon Product Analyzed by DHA method

| Carbon Number/Group | Weight percent |
|---|---|
| C4 | 0.3 |
| C5 | 1.7 |
| C6 | 6.4 |
| C7 | 25.4 |
| C8 | 30.6 |
| C9 | 8.2 |
| C10 | 9.8 |
| C11 | 6.0 |
| C12+ | 4.1 |
| Aromatics | 83.1 |
| Paraffin | 0.5 |
| i-Paraffin | 2.1 |
| Naphthenes | 0.7 |
| Unidentified | 7.5 |
| Plus | 2.9 |
| Olefins | 3.3 |

TABLE III-D

Product selectivity

| Group | Carbon mole % |
|---|---|
| C1-C4 paraffins | 5.0 |
| C2-C4 olefins | 28.4 |
| C5+ | 50.6 |
| $CO_x$ | 16.0 |

EXAMPLE IV

This example illustrates a process of converting hydrogenated carbohydrates, specifically, sorbitol, to gasoline boiling range hydrocarbons (such as for non-aromatic and aromatic gasoline boiling range hydrocarbons) by combining sorbitol with methanol as co-feeding hydrogen donor, and reacting the mixture over ZSM-5 catalyst.

In this example, a sorbitol/water/methanol mixture was co-fed along with nitrogen gas through a ZSM-5 zeolite. As shown in the Table IV-A, conversions of sorbitol and methanol were observed. The liquid product was rich in aromatics. About 7.2 weight percent of the product was $C_2$-$C_4$ olefins, 9.8 weight percent $CO_x$, 64.5 weight percent $C_5$+, and 14.4 weight percent $C_1$-$C_4$ paraffins. For the liquid product, about 86% were aromatics with most being $C_7$, $C_8$ and $C_9$.

TABLE IV-A

| | | | Sorbitol + Methanol | | |
|---|---|---|---|---|---|
| Feed 1 | Feed 2 | Gas Feed | Temp/Pressure | Catalyst | Resulting product |
| Methanol = 11.4 ml/hr | Sorbitol (50 wt %)/Water (50 wt %) = 10.9 ml/hr | N2 (250 ml/min) | 500° C./10 psig | 8.0 g ZSM-5 | *See product distribution in Table IV-B, Table IV-C, and Table IV-D below. |

TABLE IV-B

Reactant % Conversion

| Reactant | % Conversion |
|---|---|
| Sorbitol | 98.6 |
| Methanol | 96.9 |

TABLE IV-C

Liquid Phase Hydrocarbon Product Analyzed by DHA method

| Carbon Number/Group | Weight percent |
|---|---|
| Aromatics | 86.1 |
| Paraffin | 1.1 |
| I-Paraffins | 4.1 |
| Naphthenes | 1.5 |
| Unidentified | 3.8 |
| Plus | 0.9 |
| Olefins | 2.5 |
| Oxygenates | 0.0 |
| Summary by Carbon C4 | 1.8 |
| C5 | 3.9 |
| C6 | 5.0 |
| C7 | 16.2 |
| C8 | 32.6 |
| C9 | 22.8 |
| C10 | 9.2 |
| C11 | 2.1 |
| C12 | 1.6 |
| C13+ | 1.0 |

TABLE IV-D

Product selectivity

| Group | Carbon mole % |
|---|---|
| C1-C4 paraffins | 14.4 |
| C2-C4 olefins | 7.2 |
| C5+ | 64.6 |
| Cox | 9.8 |
| Coke | 3.9 |
| Total | 100.0 |

EXAMPLE V

This example illustrates the effect of pressure on the hydrocarbon product stream resulting from the conversion of carbohydrates to gasoline boiling range hydrocarbons (such as for non-aromatic and aromatic gasoline boiling range hydrocarbons). As shown in Table V-A below, with the increase in reaction pressure, the conversion of sorbitol (used in this example) was 99 weight percent. With an increase in pressure, there was an increase in $C_1$-$C_4$ paraffins, a decrease in $C_2$-$C_4$ olefins, a decrease in coke, and increase in $C_5$+, and a decrease in the amount of sorbitol carbon converted to $CO_x$. In addition, Table V-A shows that at higher pressures, more of the oxygen in sorbitol is removed as water with iso-pentane acting as the hydrogen donor. In addition to reducing the $CO_x$ yield from sorbitol, higher pressures result in upgrading of iso-pentane to a higher-octane gasoline.

TABLE V

Effect of reaction pressure on hydrocarbon product

| | Run | | |
|---|---|---|---|
| | 1 | 2 | 3 |
| Pressure, psig | 20 | 100 | 200 |
| Temperature, ° C. | 500 | 500 | 500 |
| N2 flow rate, mL/min. | 25 | 125 | 250 |
| Catalyst | ZSM-5 | ZSM-5 | ZSM-5 |
| Feed I (11 mL/hr) | Sorbitol/$H_2O$ (50:50) | Sorbitol/$H_2O$ (50:50) | Sorbitol/$H_2O$ (50:50) |
| Feed II (6.5 mL/hr) | IC-5 | IC-5 | IC-5 |
| Sorbitol conversion % | 99.0 | 99.0 | 99.0 |
| I-C-5 conversion % | 26.0 | 55.1 | 55.0 |
| Product distribution C mole % per run | | | |
| C1-C4 paraffins | 5.3 | 11.3 | 15.7 |
| C2-C4 olefins | 12.6 | 7.4 | 7.5 |
| C5+ | 53.1 | 59.9 | 59.9 |
| Coke | 7.3 | 5.1 | 4.9 |
| $CO_x$ | 21.7 | 16.3 | 12.0 |
| Sorbitol C to $CO_x$ % | 29.2 | 28.0 | 20.8 |

EXAMPLE VI

This example illustrates a process of converting oxygen-containing hydrocarbons, specifically, lactic acid, to gasoline boiling range hydrocarbons (such as for non-aromatic and aromatic gasoline boiling range hydrocarbons) using a ZSM-5 catalyst. In this example, lactic acid was converted to gasoline range hydrocarbons and chemicals (light olefins) as shown in Table VI-A below. The lactic acid conversion was 78.7 percent with selectivity to $C_1$-$C_4$ paraffins, $C_2$-$C_4$ olefins, $C_5$+ hydrocarbons.

TABLE VI-A

| Feed | Gas Feed | Temp. | Catalyst | Lactic Acid conversion (%) | Resulting product |
|---|---|---|---|---|---|
| 85% lactic acid in water (20 mL/hour) | $N_2$ (100 mL/min) | 500° C. | 6.0 g ZSM-5 | 78.7% | *See product distribution in Table VI-B below |

TABLE VI-B

| Group | Carbon mole % |
|---|---|
| C1-C4 paraffins | 4.0 |
| C2-C4 olefins | 15.6 |
| C5+ (mainly aromatics) | 42.5 |
| Cox | 38.0 |

The results shown in the above examples, clearly demonstrate that the present invention is well adapted to carry out the objects and attain the ends and advantages mentioned as well as those inherent therein. Reasonable variations, modifications and adaptations may be made within the scope of this disclosure and the appended claims without departing from the scope of the invention.

That which is claimed:

1. An integrated process for converting carbohydrates to hydrocarbons comprising:
    a) contacting a carbohydrate-containing material with a bi-functional solid acid supported metal catalyst under a condition sufficient to form a liquid product comprising hydrogenated product, and
    b) contacting said liquid product comprising hydrogenated product with a catalyst composition comprising a zeolite under a condition sufficient to form a reaction product containing gasoline boiling range hydrocarbons.

2. The process of claim 1, wherein said carbohydrate-containing material has an effective hydrogen to carbon ratio of less than about 1.

3. The process of claim 1, wherein said carbohydrate-containing material is selected from a group consisting polysaccharide, monosaccharides, and mixture thereof.

4. The process of claim 1, wherein said carbohydrate-containing material is selected from the group consisting of starch, cellulose, glycogen and mixtures thereof.

5. The process of claim 1, wherein said solid acid of said bi-functional catalyst is ion-exchange resin.

6. The process of claim 5, wherein said ion-exchange resin is a polystyrene supported resin containing sulfonic acid groups.

7. The process of claim 1, wherein said metal of said bi-functional catalyst is selected from a group consisting of ruthenium (Ru), palladium (Pd), platinum (Pt), rhodium (Rh), nickel (Ni) copper (Cu), iron (Fe), cobalt (Co), zinc (Zn), lead (Pb), tin (Sn), mercury (Hg), and mixtures thereof.

8. The process of claim 1, wherein said bi-functional catalyst is acid resin supported ruthenium (Ru) and palladium (Pd) catalyst.

9. The process of claim 1, wherein said conditions sufficient to form said hydrogenated product comprises a temperature in the range of from about 50° C. to about 250° C. and a pressure in the range of from about 0 to about 2000 psig.

10. The process of claim 1, wherein said condition sufficient to form a reaction product containing gasoline boiling range hydrocarbons comprises a temperature in the range of about 100° C. to about 1000° C. and a pressure in the range of from about 1 to about 500 psig.

11. The process of claim 1, wherein said liquid product comprising hydrogenated product comprises polyhydric alcohols or polyols.

12. The process of claim 1, wherein said polyhydric alcohols or polyols is selected from the group consisting of diols, glycols, sugar alcohol, sorbitol, and xylitol.

13. The process of claim 1, wherein said liquid product comprising hydrogenated product is selected from the group consisting of diols, glycols, sugar alcohol, sorbitol, xylitol, ketones, epoxides, furans, organic acids, and any mixture thereof.

14. The process in accordance with claim 1 wherein said zeolite is selected from the group consisting of ZSM-5, ZSM-8, ZSM-11, ZSM-12, ZSM-35, ZSM-38 and combinations thereof.

15. The process in accordance with claim 1 further comprises a step of modifying said zeolite by a steam treatment prior to said step b.

16. The process in accordance with claim 1 further comprises a step of modifying said zeolite by an acid treatment prior to said step b.

17. The process in accordance with claim 1 further comprises a step of modifying said zeolite by a metal cation prior to said step b.

18. An integrated process for converting carbohydrates to hydrocarbons comprising:
    a) contacting a carbohydrate-containing material with a bi-functional solid acid supported metal catalyst under a condition sufficient to form a liquid product comprising hydrogenated product, and
    b) contacting said liquid product comprising hydrogenated product and a hydrogen donor compound with a catalyst composition comprising a zeolite under a reaction conditions sufficient to form a reaction product containing gasoline boiling range hydrocarbons.

19. The process of claim 18, wherein said hydrogen donor compound comprises one or more hydrocarbon compounds.

20. The process of claim 18, wherein said hydrogen donor compound comprises one or more alcohol.

21. The process of claim 18, wherein said hydrogen donor compound comprises methanol or isopentane.

* * * * *